Figure 1:
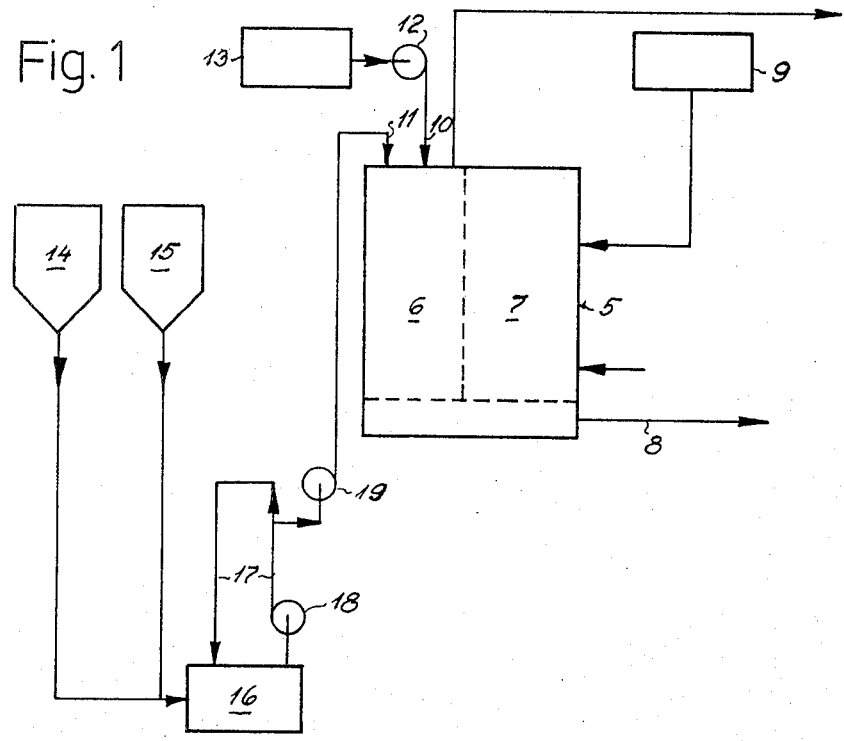

United States Patent [19]
Jorgensen

[11] 3,858,532
[45] Jan. 7, 1975

[54] FURNACE FOR INCINERATING SOLID AND LIQUID WASTE

[75] Inventor: Gunnar Jorgensen, Bagsvaerd, Denmark

[73] Assignees: A/S Atlas, Ballerup; F. L. Smith & Co. A/S, Valby, both of, Denmark

[22] Filed: Aug. 16, 1973

[21] Appl. No.: 388,801

[30] Foreign Application Priority Data
Aug. 28, 1972  Denmark.......................... 4249/72

[52] U.S. Cl.................................. 110/7 S, 110/8 C
[51] Int. Cl............................................... F23g 7/00
[58] Field of Search............. 110/7 R, 7 S, 8 R, 8 C

[56] References Cited
UNITED STATES PATENTS
3,604,375  9/1971  Bruns et al............................ 110/7
3,780,674  12/1973  Liu......................................... 110/8

Primary Examiner—Kenneth W. Sprague
Attorney, Agent, or Firm—Merriam, Marshall, Shapiro & Klose

[57]   ABSTRACT

The invention relates to a furnace for incinerating solid and liquid waste, the furnace having means for preheating the furnace chamber and for supplying heat in addition to that produced by combusting the waste. According to the invention, the furnace chamber is divided in two compartments by a divisional wall not substantially inhibiting heat transmission, one compartment to receive liquid waste, and the other to receive solid waste, each compartment having separate means for supplying air for the combustion.

2 Claims, 2 Drawing Figures

FURNACE FOR INCINERATING SOLID AND LIQUID WASTE

This invention relates to a furnace for incinerating solid and liquid waste, said furnace being of the kind having means for preheating of the furnace chamber and for additional supplying of heat, if the calorific value of the waste is insufficient for maintaining a proper combustion temperature.

Furnaces of the said kind are useful in many industrial plants, where waste turns up, which is difficult to get rid of either, in the case of liquid waste, because it cannot be fed into the common sewage system or, when fed into this system, would pollute or poison the recipient, or, in the case of solid waste, because dumps or incineration plants receiving such waste are situated far away.

Also in ships, it is an increasingly big problem to get rid of liquid waste, which is often filled with sludge and oil-containing, as well as of solid waste, because the formerly ordinary disposal by dumping into the seas is everywhere regarded with increasing disfavour.

In known waste furnaces of the said kind it is common to mix the solid and the liquid waste immediately before or during the incineration in the furnace chamber, possibly with addition of coal or oil to increase the calorific value. In order to get total combustion of the wast mixture, and of the gasses usually produced by heating of solid waste, it is necessary to design the furnace with a fairly big combustion chamber, because the combustion requires a relatively large surplus of air, which is blown through the waste and carries away rather large amounts of dust in the shape of ashes and only partly combusted particles. The ashes and particles are difficult to remove to a satisfying degree by subsequent auxilliary combustion, and thus often require some kind of air purification means, the latter being expensive and space requiring.

The object of the invention is to provide an incineration furnace for liquid and solid waste, in which the dust emission is substantially reduced as compared with the known furnaces, which requires less space, because the necessary surplus of combustion air has been reduced, and the air supply takes place in such way as to reduce dust raising, and which also on this account is specifically suited for use in ships, where it is important to be able to use plants requiring as little space as possible.

This object is attained, according to the invention, by the providing in the furnace chamber of a divisional wall not substantially inhibiting heat transmission, said wall dividing said chamber into two compartments, one of which is adapted to receive liquid waste, the other being adapted to receive solid waste, and each of said compartments having its separate supply of air for the combustion.

For the combustion of the liquid waste no substantial surplus of air is required, and when the heat from this combustion is transmitted through the divisional wall, the solid waste will be heated to its combustion temperature. By means of the air supply, it is possible to adjust the time required for the combustion of the supplied waste and at the same time to obtain total combustion of the waste without using a particularly large surplus of air.

Also sedimentation sludge with a fairly large proportion of organic components may be incinerated by mixing it with oil, particularly waste oil or oil sludge from ships, and recirculating until it is removed, at a suitable place in the recirculation system, to be supplied to the furnace compartment for liquid waste through an atomizing burner.

In an appropriate embodiment of the furnace according to the invention, a connecting passage for combustion gases and products is provided between the two compartments in the furnace chamber. This results in combustible gasses being able to pass into and be combusted in the combustion compartment for liquid waste, thus assisting in maintaining the desired combustion temperature in the latter, usually between 800° and 1,000° C.

Particularly simply and appropriately, such passage according to the invention consists in at least one opening being provided in the divisional wall between the two compartments of the furnace chamber, so that no space for such passage is required outside the furnace.

The divisional wall may appropriately be made from refractory bricks dividing the combustion chamber so that its two compartments are placed side by side.

In the following, a more detailed description of the furnace of the invention will be given with reference to the accompanying drawing, in which FIG. 1 schematically illustrates the use of the furnace, and FIG. 2, also schematically, shows a vertical cross section of the furnace itself.

In FIG. 1, 5 represents the furnace of the invention. It is divided, as suggested, by the vertical broken line, into two combustion compartments 6 and 7, the compartment 6 being intended for incineration of liquid waste and the compartment 7 for incineration of solid waste. The horizontal broken line indicates a grate through which ashes can drop to the bottom of the furnace and be removed as suggested by the arrow 8.

Solid waste is collected in a container 9 and from there fed mechanically or manually into the compartment 7.

At the top of the compartment 6, two atomizing burners are mounted as suggested by the arrows 10 and 11. Oil is supplied to the burner 10 by means of a pump 12 from a container 13. The said burner 10 serves partly for preheating the furnace 5, and partly as an auxiliary burner, if the combustion of the waste cannot in itself keep the furnace at the desired temperature.

The burner 11 serves for the combustion of the liquid waste. The latter is collected in two tanks 14 and 15, of which one for instance may be intended for oil containing waste and the other for other kinds of liquid waste.

The contents of the tanks 14 and 15 are conducted to a socalled sludge tank 16, the contents of which are steadily recirculated through a circulation pipe 17 by means of a pump 18. A part of the recirculated mixture is removed at a suitable place in the circulation pipe 17, and is supplied by means of a pump 19 to the burner 11 and from there into the combustion compartment 6, from the top of which the combustion gasses are conducted away as suggested by the arrow 20.

Figure 2:
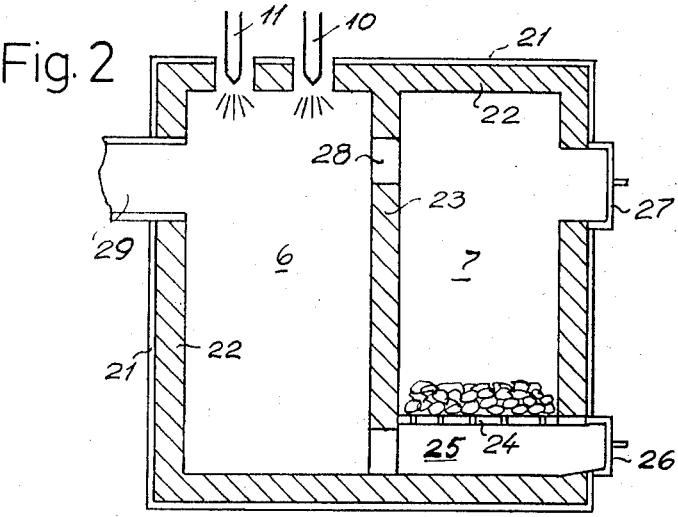

The design of the furnace appears from FIG. 2. In the illustrated embodiment, the furnace has an outer jacket 21 made from steel sheets, and it has an inner lining 22 made from refractory bricks. A wall 23 made from refractory bricks divides the furnace chamber into the two combustion compartments 6 and 7, being limited at the bottom by a grate 24, below which an ash-hole 25 is situated. The ashes are removed as need be through a door 26.

The solid waste is introduced into the compartment 7 through a door 27.

At the top of the divisional wall 23, one or several openings 28 are provided through which the compartments 6 and 7 are mutually connected.

The auxiliary burner 10 and the burner 11 for the liquid waste are mounted at the top of the compartment 6, and at a suitable place near the top of the latter is placed an outlet 29 for the combustion products.

The furnace is operated as follows:

By means of the auxiliary burner, the compartments 6 and 7 are heated to the working temperature, the heat being transmitted from the compartment 6 to the compartment 7 through the wall 23. Then the burner 11 for the liquid waste is started, and solid waste is fed into the compartment 7. Temporarily, no combustion air is supplied to the compartment 7, so that only a heating of the solid waste takes place to pyrolyze the latter, the thus liberated gasses passing through the opening 28 into the compartment 6, where their combustible contents are combusted. When the pyrolysis of the solid waste is terminated, air is supplied to the compartment 7 to combust the pyrolyzed waste.

The furnace is in known manner provided with automatics governing the function of the auxiliary burner 10 in dependency of the furnace temperature.

If desired, the outlet 29 may be connected to a not shown auxiliary combustion chamber which may be built together with the furnace.

The design of the furnace may be changed in various ways without departing from the scope of the invention. Thus, the auxiliary burner 10 may be omitted, the furnace being preheated by solely supplying oil to the burner 11 until the working temperature of the furnace is reached, after which supply of the combustible liquid waste replaces the supply of oil.

I claim:

1. A furnace for incinerating solid and liquid waste, comprising
   a. a furnace chamber,
   b. means for preheating the furnace chamber and for supplying additional heat to maintain a proper combustion temperature so as to allow for the incineration of waste of insufficinet calorific value,
   c. a wall not substantially inhibiting heat transmission dividing the furnace chamber into two compartments, said wall having a connecting passage for combustion gases between the two compartments of the furnace chamber,
   d. means for supplying liquid waste to one of the compartments, and solid waste to the other, and
   e. separate means for supplying air of combustion to each of the compartments of the furnace chamber.

2. A furnace according to claim 1, in which the connecting passage consists of at least one opening in the divisional wall between the compartments of the furnace chamber.

* * * * *